Feb. 25, 1958 R. F. BORKENSTEIN 2,824,789
APPARATUS FOR ANALYZING A GAS
Filed May 10, 1954 2 Sheets-Sheet 2
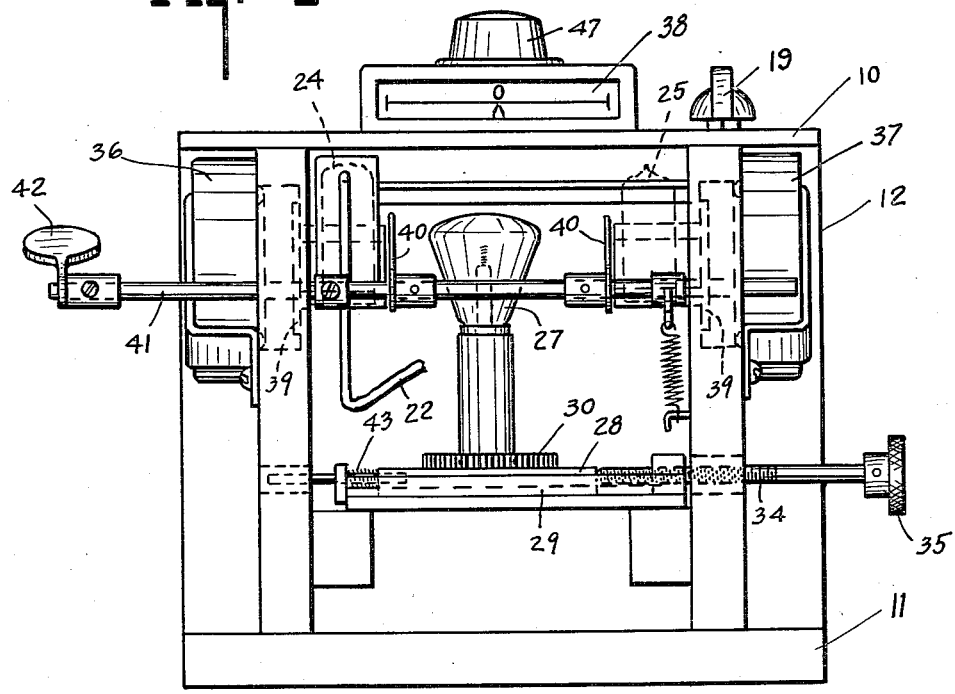
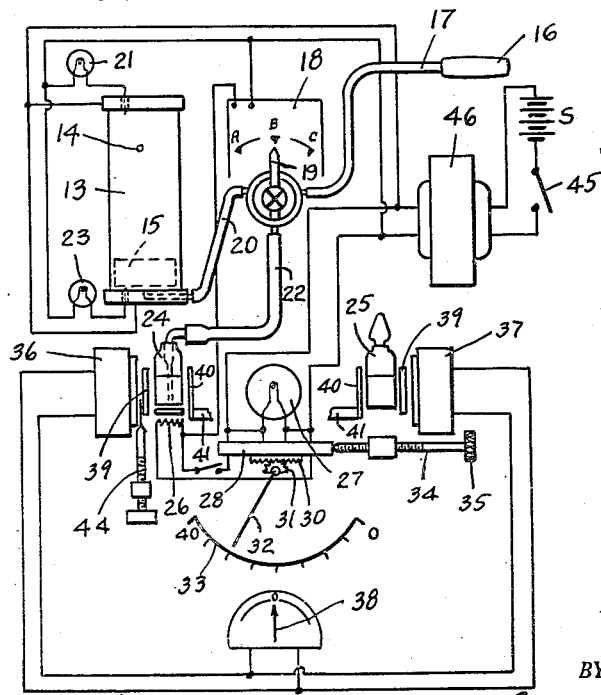
INVENTOR.
ROBERT F. BORKENSTEIN.
BY
Lockwood, Galt, Woodard & Smith
ATTORNEYS.

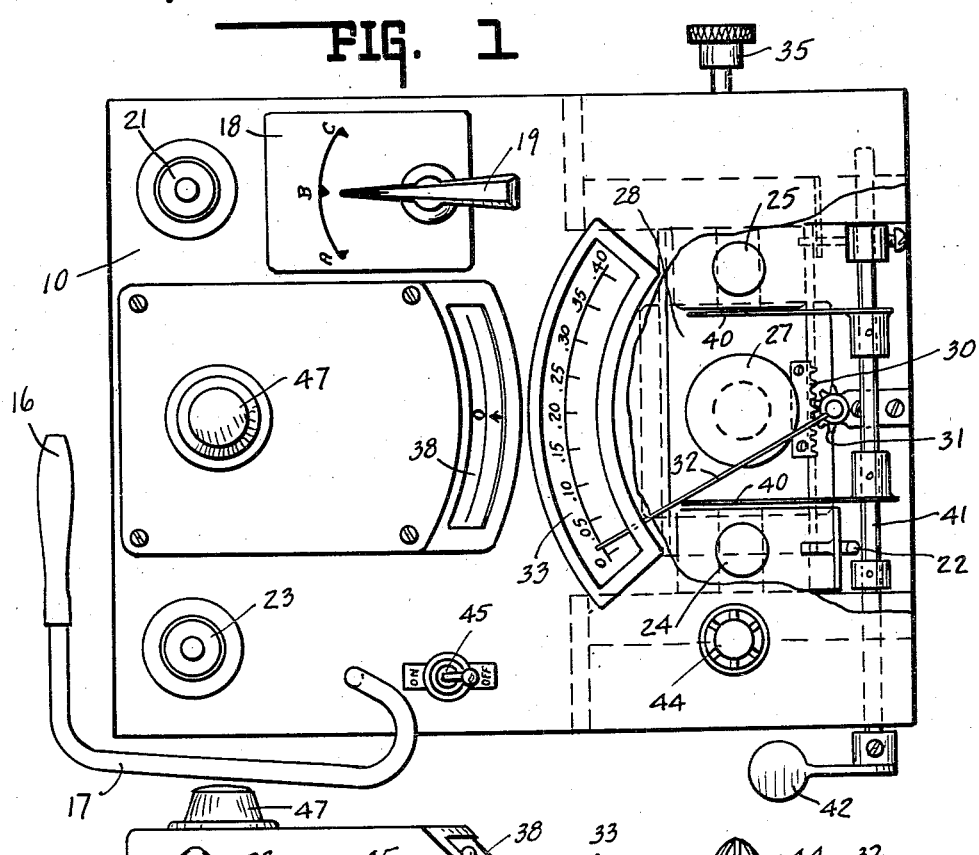
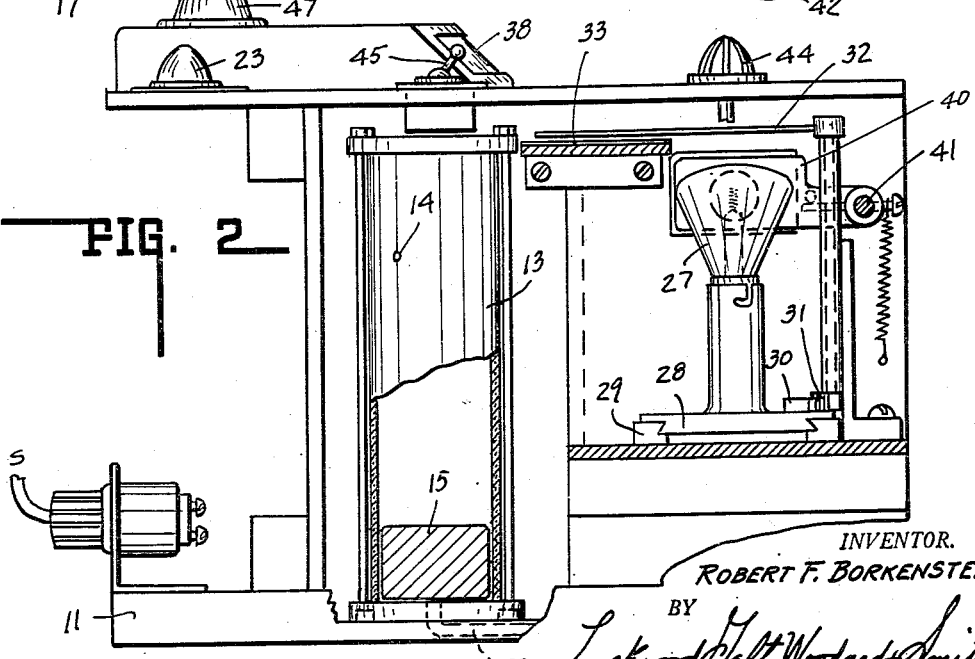

United States Patent Office 2,824,789
Patented Feb. 25, 1958

2,824,789

APPARATUS FOR ANALYZING A GAS

Robert F. Borkenstein, Indianapolis, Ind.

Application May 10, 1954, Serial No. 428,559

1 Claim. (Cl. 23—254)

This invention relates to the method of analyzing the contents of a gas, and the apparatus for conveniently practicing the method, as in measuring the amount of dissolved volatile hydrocarbons, such as the alcoholic, acetone or ether content in the human breath. It is particularly useful and applicable for measuring the alcoholic content of individuals engaged in operating automobiles and other machines requiring mental alertness.

It is the object of this invention to provide a simplified, reasonably accurate and effective method of testing gases, and particularly the alcoholic content of an individual, without the requirement of technicians or laboratory analysis, and wherein the determination and fiindings may be quickly and readily observed during the test.

In general the above is accomplished and this invention is directed toward obtaining a determination and reading electrophotometrically. For this purpose a measured amount of the gas to be analyzed, or the breath from the lungs of an individual with respect to an alcoholic test, is passed through a chemical solution which varies in its light transmitting characteristics, and measures electrophotometrically the variation in light transmission therethrough as between such solution in its normal condition or free of gas, as compared with a solution through which the gas has been passed.

The above may be conveniently accomplished by mounting a pair of clear glass ampoules containing the same solution, and which solution may include an oxidizing agent, passing a measured quantity of gas through one of the ampoules while leaving the other ampoule free of such gas, positioning a movable source of light between the ampoules with a photovoltaic cell on opposite sides thereof, electrically measuring the transmission of light from the source through the respective ampoules, and recording the relative position of the light source thereto for equalizing the current generated by said cells.

The full nature of the invention will be understood from the accompanying drawings and the following description and claim:

Fig. 1 is a plan view of the top panel of the instrument or apparatus by which the method is practiced, with parts broken away and parts omitted.

Fig. 2 is a side elevation of the instrument, with parts removed and parts in section.

Fig. 3 is a front elevation of the instrument with parts removed and parts omitted.

Fig. 4 is a schematic illustration and wiring diagram of the instrument, and illustrative of the method.

In the drawings there is shown an instrument by which the method of this invention is practiced, and which instrument is particularly adaptable to measuring the alcoholic content of the human breath, and particularly the alveolar or deep lung breath. The instrument illustrated herein includes a casing having a top panel 10 and a bottom support 11 with side walls 12. Within the casing there is mounted a vertical gas measuring cylinder 13 closed at the opposite ends and near the top thereof provided with an air vent 14. Slidable in said cylinder there is a piston valve 15 movable between the bottom and top thereof. It is the purpose of said cylinder to catch and measure a predetermined quantity or charge of gas to be analyzed.

As applied to the apparatus for analyzing alcohol in an individual, there is provided a mouth piece 16 connected with a hose 17 into which the individual blows. The hose 17 is connected with a control valve generally indicated at 18 which is actuated by a handle 19. When the handle 19 is turned from the off position b to the position indicated at a, the gas or breath passes through a tube 20 to the bottom of the cylinder 13, raising the valve 15 until it reaches the top of the cylinder above the vent 14. Gas will then vent from the cylinder but retain the valve in position at the top of the cylinder to make electrical contact through an indicating light 21. When the light 21 flashes on it indicates that the cylinder is full of gas. The handle 19 may then be turned to the position c which connects the tube 20 with a tube 22. The gas then passes from the bottom of the cylinder through the tube 20 and tube 22 for escape through a solution, as hereinafter described.

This arrangement is such that breath passing into the cylinder may escape therefrom until the alveolar or deep lung breath has filled the cylinder with a predetermined charge. As the charge of gas then is permitted to flow from the cylinder through the tubes 20 and 22, the valve 15 will have closed the vent 14, thus establishing and measuring the remaining charge of alveolar breath for subsequent analysis. When the full charge of gas or breath has passed from the cylinder, the valve 15 will have been lowered to its lowermost position, making contact to energize a signal light 23. Upon the light 21 being deenergized and light 23 energized, the full predetermined charge of gas will have passed from the cylinder.

The charge of the gas from the cylinder passes through the tube 22 and through the liquid contained in an ampoule 24. The apparatus provides spaced pockets for receiving ampoules 24 and 25. Said ampoules each contain the same solution in the same quantity and are normally sealed when placed in the pockets. However, the ampoule 24 has its neck broken to receive a nozzle extending to the bottom of the liquid from the tube 24. Such liquid preferably comprises a solution containing an oxidizing agent, for example 3 ml. of .025% potassium dichromate in 50% by volume sulfuric acid. The dichromate of this solution will oxidize .187 mg. of ethyl alcohol. Such solution is normally colored for resisting light transmission therethrough to a degree. According to the amount of alcohol or the like contained in the charge of gas passing through said solution in the ampoule 24, the solution will become discolored, becoming more transparent with respect to light transmission therethrough, while the solution in the sealed ampoule 25 will retain the fixed light transmitting characteristics.

Thus, the change in light transmitting characteristics of the solution in ampoule 24 may be compared with the fixed light transmitting characteristics of ampoule 25 for determining the alcoholic content of the gas. However, for this purpose the solution in the ampoule 24 must be heated, and to that end there is provided a heating filament 26 immediately under the ampoule 24. This filament is energized upon the valve handle 19 being turned to position a to heat the solution sufficiently before receiving the charge of gas.

Between the spaced ampoules there is a light source in the form of an incandescent bulb 27 which is mounted upon a sliding carriage 28 slidable upon a fixed track 29. Said carriage is provided with a toothed rack 30 meshing with a pinion 31 connected with a pointer 32.

Said pointer swings over a dial 33 located in the top panel 10 for convenient observation. The carriage 28 may be moved back and forth by a screw 34 having a screw handle 35 extending from the side of the casing.

On the opposite far sides of the ampoules there are mounted photovoltaic cells 36 and 37, said cells being electrically connected to each other in opposition. A sensitive meter 18 is mounted in the top panel 10 for convenient observation. Intermediate the photovoltaic cell and the adjacent ampoules 24, 25 there is provided a filter indicated at 39. Between the source of light 27 and each of said ampoules there is provided an opaque shutter 40. The shutters 40 are secured to a shaft 41 extending laterally from one side of the casing into exposed position and to which there is secured an operating handle 42. The handle 42 and shutters 40 are normally biased in position to prevent light rays from reaching the ampoules until after the charge of gas has finished bubbling through the solution in the ampoule 24, as indicated by the valve 15 reaching its lowermost position and energizing the indicating lamp 23.

Thereupon the handle 42 may be pressed down to clear the path for the light rays from the lamp 27 to the respective ampoules. It may here be noted that for convenience the carriage 28 is biased in one direction by a compression spring 43, while being manually moved in the opposite direction against said spring by the screw 34. Since it is important that the photovoltaic cells be precisely balanced with respect to the light transmitted thereto through the solution of said ampoules, an adjusting screw 44 is secured to the cell 36 for adjustably positioning the screw with respect to the light source. Through this means, before the charge of gas enters the solution, the cells are thus balanced until the indicator 38 is at zero position and with the light positioned so that the indicator 32 is also at zero position.

The operation of the apparatus may be described as follows: When it is out of use the circuit control switch 45 is in circuit breaking position. When such switch is closed, the circuit is established from the source S through the transformer indicated at 46. Thereupon the gas is introduced through the hose 17, or in the case of an alcoholic passed through the mouth piece 16 and hose 17, the valve 19 being swung to position $a$. A circuit is thereby made through the heating element 26, the ampoules 24 and 25 having been inserted in their pockets with the former broken to receive the venting end of the gas tube 22. The light source 27 will be energized but the shutters 40 will be in their screening position to protect the solutions from the light. Gas will be passed into the cylinder 14, raising the valve 15 to the top of the cylinder, whereupon the indicating light 21 will flash on, showing that gas is passing therethrough and out of the vent 14.

After sufficient lapse for the alveolar or deep lung breath to have passed into the cylinder, the operator moves the valve to position $c$. The weight of the valve 15 will have forced a predetermined charge of gas—determined by the position of the vent 14—to pass from the cylinder into the ampoule 24 to bubble up through the solution. This will continue until the valve 15 has reached the bottom of the cylinder, thus measuring the charge of gas and lighting the signal lamp 23. Thus, the solution in the ampoule 24 has been charged with a predetermined amount of gas. The source of light 27 will have been adjusted to a position for equalizing and balancing the action of the photovoltaic cells 36, 37.

The solution having been charged, the shutters are removed by pressing down on the handle 42 and the adjusting screw 34 is then actuated to so position the light source 27 relative to the cells as to again equalize them through the light sensitive meter 38 and bring it to zero; the light source 27 must be moved by the screw 34 nearer to the ampoule 25 and further from the ampoule 24 through which the light more readily passes. This relative position of the light source is then registered through the rack and pinion 31 on the indicating dial 33, swinging the handle 32 from its zero position to thereby indicate the relative light transmitting characteristics of the gas charged solution in respect to the same solution free of gas.

While the instrument as above described is adjusted for a one hundred ml. charge of gas, any desired charge may be employed provided the calibration and reagents are varied in proportion. In the case of human breath, the valve 15 is raised by the pressure of the breath to a predetermined level according to the location of the vent 14. The breath may continue to pass through the cylinder until the desired alveolar breath phase is trapped therein by stopping the flow of breath through manipulation of the valve 18 at this point. This phase of the breath can be retained for analysis since upon the piston valve dropping to seal off the vent a predetermined charge will be trapped which will be forced through the solution of the ampoule 24 upon moving the valve 18 to the position $c$. By venting the breath from the first blowing operation after, for example, fifteen seconds, a definite mixture of dead space and alveolar breath will be obtained. The first phase of the mixture will be very close to 90% alveolar breath.

This is passed through the solution of ampoule 24. The solution of both ampoules is made of 3 ml. of .025% potassium dichromate in 50% by volume sulfuric acid. The dichromate in this solution will oxidize .187 mg. of ethyl alcohol. One ml. of blood from the alcoholic subject will have between .00 mg. and 4 mg. of alcohol in it. 2100 ml. of alveolar breath will contain the same amount of alcohol as the 1 ml. of blood. Thus, 90 ml. will contain $\frac{1}{23}$ as much alcohol as 1 ml. of blood. On this basis, the range of .00-4 mg. will be represented in this instrument by a range of .00-.170 mg. of alcohol. It may be understood that at a blood alcohol concentration of .4 mg. of alcohol per ml. of blood, the 90 ml. of alveolar breath will not quite use up all the potassium dichromate solution. All intermediate levels will be represented by the amount of the potassium dichromate left. The change is gradual from yellow to clear. The dichromate solution must be hot for this reaction. The small heating element 26 raises the solution to the necessary temperature in one minute. The switch controlling this element is incorporated in the control valve 18. As the dichromate solution is sealed in ampoules, it will keep indefinitely.

The amount of the potassium dichromate in the gassed ampoule 24 is measured by comparing it photometrically with a duplicate ampoule 25. The light from a movable light source 27 is passed through the two ampoules, then through blue filters 39 transmitting light at about 430 millimicrons. These light beams fall onto photovoltaic cells 36, 37 which are connected to each other in opposition. The sensitive meter 38 is connected across this circuit to indicate the direction of flow of current. If both cells 28 are generating equal current the meter will read zero. The position of the light source is indicated by a pointer attached to the light carriage. Thus, the relative intensities of the yellowness of the solutions can be measured by moving the light until the amount of light falling on the two cells is equal, and noting its position relative to its original zero position of the indicator 33 when the test started.

The invention claimed is:

An apparatus for analyzing a gas including a light transmitting container having therein a chemical solution affected in its light transmission characteristics by a charge of the gas to be passed therethrough, a comparative light transmitting medium spaced from said container, a gas measuring cylinder, a tube leading from a source of gas supply to one end of said cylinder, a three way valve in said tube, a pipe leading from said valve to said light transmitting container; said valve when in one position establishing communication between said source and said cylinder and closing said pipe and when in a second position closing off said source and establishing communication between said tube and said pipe and closing off all passage of gas when in its third position, means for venting the preliminary flow of gas from said source from said cylinder and trapping a selected portion and predetermined quantity of said gas therein, a movable light source positioned between said container and medium, photo voltaic cells mounted on the opposite far sides of said container and media to receive light rays passing through the solution and media respectively, a null meter, an electric circuit connecting said cells and said null meter, means for adjusting the relative position of said light source between said container and media to balance the flow of current from said cells through said null meter, and an indicator operably associated with said light source to indicate the degree of movement thereof from a cell balanced position to the flow of gas through said solution to a balanced position following the flow of gas therethrough.

References Cited in the file of this patent

UNITED STATES PATENTS

| | | |
|---|---|---|
| 391,956 | Frazer et al. | Oct. 30, 1888 |
| 1,013,142 | Engberg | Jan. 2, 1912 |
| 1,304,327 | Klay | May 20, 1919 |
| 1,695,031 | Schmick | Dec. 11, 1928 |
| 1,739,373 | Race | Dec. 10, 1929 |
| 1,967,583 | McFarlane et al. | July 24, 1934 |
| 2,019,871 | Pettingill et al. | Nov. 5, 1935 |
| 2,043,816 | Story | June 9, 1936 |
| 2,062,785 | Harger | Dec. 1, 1936 |
| 2,208,840 | Gialloreto et al. | July 23, 1940 |
| 2,310,472 | Sullivan | Feb. 9, 1943 |
| 2,382,381 | Calvert et al. | Aug. 14, 1945 |
| 2,389,046 | Hare | Nov. 13, 1945 |
| 2,417,877 | Lewis | Mar. 25, 1947 |
| 2,655,289 | Peal | Oct. 13, 1953 |

FOREIGN PATENTS

| | | |
|---|---|---|
| 7,919 | Great Britain | Mar. 27, 1897 |

OTHER REFERENCES

Gibbs, Jr.: "Optical Methods of Chemical Analysis," McGraw-Hill Book Company, Inc. (1942), pages 148–153.

Article "Alcometer," published in Mechanix Illustrated, December 1949, pages 82, 83 and 142.